(12) United States Patent
Toth et al.

(10) Patent No.: US 7,100,924 B2
(45) Date of Patent: Sep. 5, 2006

(54) ELASTOMERIC HINGED SEAL

(75) Inventors: David Michael Toth, Brighton, MI (US); Bhawani Sankar Tripathy, Ann Arbor, MI (US)

(73) Assignee: Federal-Mogul Worldwide, Inc., Southfield, MI (US)

( * ) Notice: Subject to any disclaimer, the term of this patent is extended or adjusted under 35 U.S.C. 154(b) by 160 days.

(21) Appl. No.: 10/757,919

(22) Filed: Jan. 15, 2004

(65) Prior Publication Data

US 2005/0156384 A1    Jul. 21, 2005

(51) Int. Cl.
*F16J 15/32* (2006.01)

(52) U.S. Cl. .................. 277/558; 277/562; 277/560; 277/570

(58) Field of Classification Search .............. 277/570, 277/559, 562, 560, 569, 572
See application file for complete search history.

(56) References Cited

U.S. PATENT DOCUMENTS

| | | | |
|---|---|---|---|
| 4,969,653 A | 11/1990 | Breen | |
| 5,183,271 A * | 2/1993 | Wada et al. | 277/351 |
| 5,209,502 A * | 5/1993 | Savoia | 277/562 |
| 5,346,662 A * | 9/1994 | Black et al. | 264/138 |
| 5,556,112 A | 9/1996 | Brandt | |
| 5,615,894 A * | 4/1997 | vom Schemm | 277/559 |
| 5,649,710 A * | 7/1997 | Kanda | 277/371 |
| 5,833,136 A * | 11/1998 | Japp | 238/14 |
| 5,921,555 A | 7/1999 | Johnston | |
| 6,079,715 A * | 6/2000 | Johnen et al. | 277/565 |
| 6,149,158 A * | 11/2000 | Tripathy | 277/307 |
| 6,168,164 B1 * | 1/2001 | Toth et al. | 277/559 |
| 6,213,476 B1 * | 4/2001 | Chandler et al. | 277/569 |
| 6,244,600 B1 | 6/2001 | Leturcq | |
| 6,336,638 B1 * | 1/2002 | Guth et al. | 277/500 |
| 6,401,322 B1 | 6/2002 | Matsushima | |
| 6,497,415 B1 | 12/2002 | Castleman et al. | |
| 6,513,810 B1 * | 2/2003 | Pataille | 277/549 |
| 6,520,507 B1 | 2/2003 | Pataille et al. | |
| 6,620,361 B1 * | 9/2003 | Longtin et al. | 264/138 |
| 6,715,768 B1 * | 4/2004 | Bock et al. | 277/559 |
| 6,729,624 B1 * | 5/2004 | Johnston | 277/560 |
| 2002/0158421 A1 | 10/2002 | Johnston | |
| 2003/0006563 A1 | 1/2003 | Cater et al. | |

* cited by examiner

*Primary Examiner*—Katherine Mitchell
(74) *Attorney, Agent, or Firm*—Robert L. Stearns; Dickinson Wright PLLC

(57) ABSTRACT

A hydrodynamic PTFE seal for a rotating part including a first portion supported by a flexible, elastomeric member and a second portion extending from the first portion past the elastomeric member along the rotating part. The second or trailing portion of the seal is concentrically disposed about the rotating part. The first portion of the seal attached to the elastomeric member is also concentrically disposed around the rotating part. The seal can also include a living hinge portion disposed between the first and second portions. The first portion, the second portion and the living hinge portion can jointly define a continuous sealing surface.

15 Claims, 2 Drawing Sheets

ELASTOMERIC HINGED SEAL

BACKGROUND OF THE INVENTION

The invention relates generally to hydrodynamic seals and, more particularly, to a hydrodynamic seal that surrounds a rotating part.

RELATED PRIOR ART

Hydrodynamic seals can engage a rotating shaft to contain oil or grease in a desired location. Common applications for such seals include engine crankshafts and transmission shafts. The seal can be supported by an elastomeric member that can resiliently deform. The elastomeric member can deform to enhance the likelihood that the seal will stay in continuous, intimate contact with the shaft despite any lack of concentricity between the rotating shaft and the structure supporting the seal. The seal can be formed from polytetrofluoroethylene and be bonded to the elastomeric member along its entire length.

SUMMARY OF THE INVENTION

The present invention provides a seal including a first portion connected to an elastomeric member and a second portion extending past the elastomeric member along the length of the shaft. Both portions of the seal are in sealing engagement with the shaft. The first and second portions can be formed from polytetrafluoroethylene.

The present invention also provides a seal having an annular living hinge portion. The hinge portion can extend between the first portion and the second portion and can extend past the elastomeric member. The hinge portion can be defined by an outwardly facing annular notch.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views and wherein.

DETAILED DESCRIPTION

Figure 1:
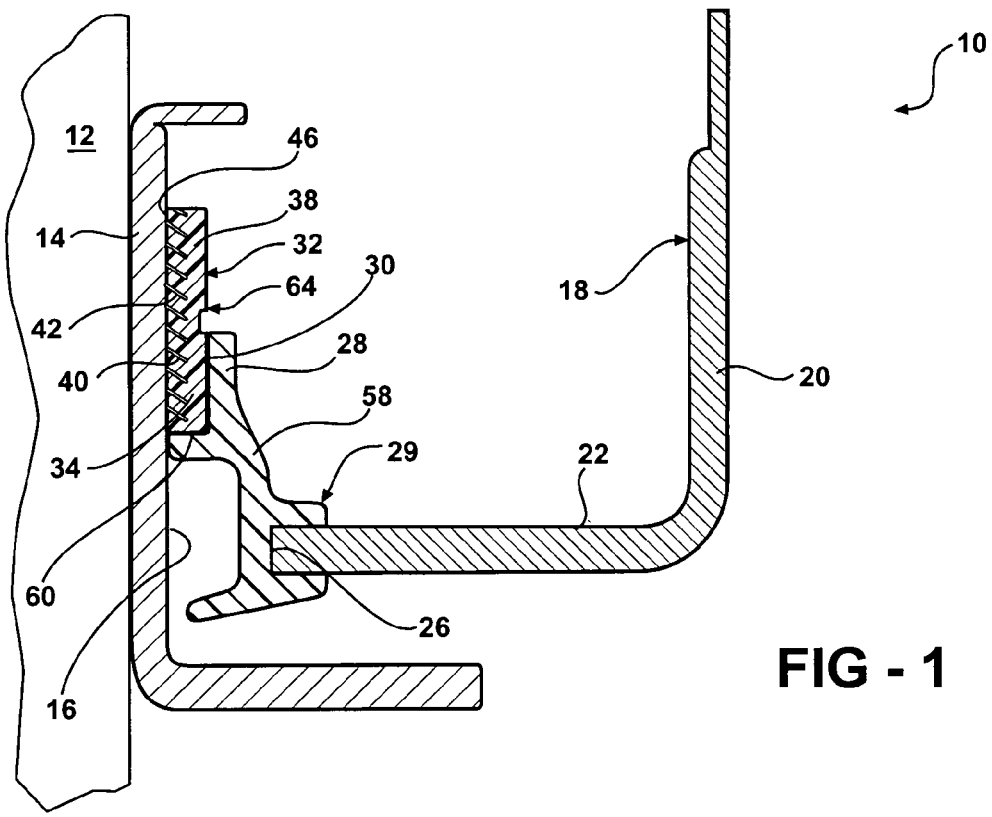
FIG. 1 is a partial cross-sectional view of the seal according to a preferred embodiment of the invention shown in sealing engagement with a rotatable shaft.
Figure 2:
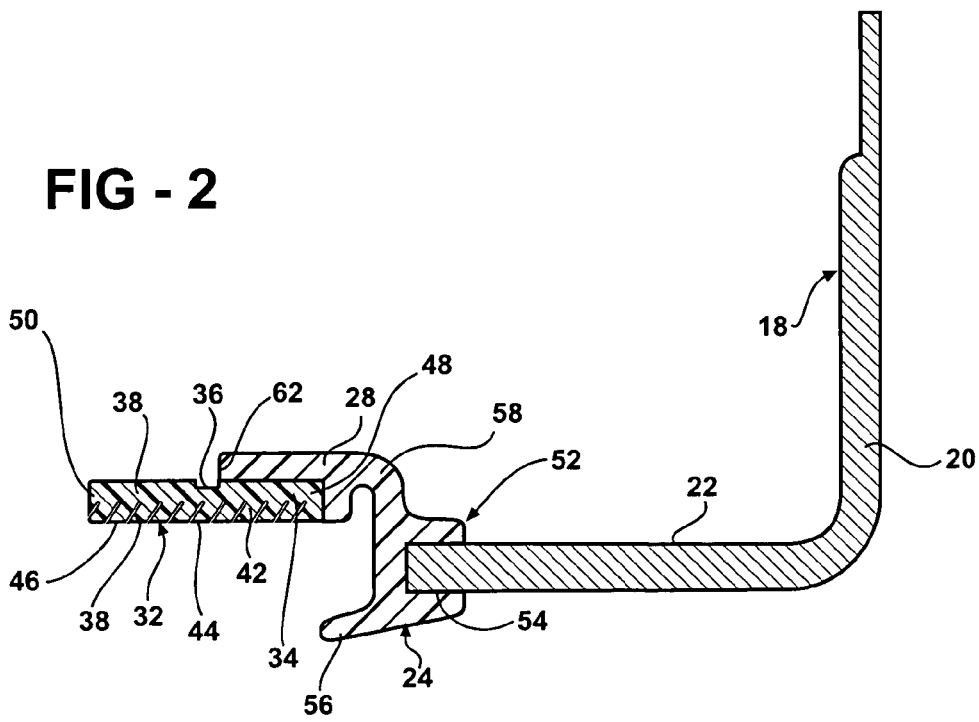
FIG. 2 is a partial cross-sectional view of the seal shown in FIG. 1 disengaged with respect to the rotatable shaft.

Referring now to FIGS. 1 and 2, the present invention provides a seal assembly 10 including an annular flexible support member 24 and a seal 32. The annular flexible support member 24 includes a lip 28 defining an annular supporting surface 30 extending from a first edge 60 to a second edge 62. The seal 32 includes a first collar portion 34 connected to the annular support surface 30. The first collar portion 34 defines a first sealing surface 40. The seal 32 can extend past the edge 62 of the lip 28 to an end 50, defining a second collar portion 38. The second collar portion 38 can extend past the annular supporting surface 30 and define a second sealing surface 46.

The seal 32 can engage and seal against a rotatable shaft 12, or a wear sleeve 14 immovably associated with the shaft. The wear sleeve 14 can encircle the rotatable shaft 12 and define an outwardly facing annular sealing surface 16. The sealing surfaces 40, 46 can contact and seal against the surface 16. The surfaces 16, 30, 40, 46 can be concentric with respect to one another.

The seal 32 can be supported for engagement with the shaft 12 by a carrier 18 in combination with the annular flexible support member 24. The carrier 18 can include a tubular portion 20 spaced from and substantially concentric with the wear sleeve 14. The carrier 18 can also include a radial flange portion 22 extending from the tubular portion 20. The radial flange portion 22 can define an aperture 26. A portion 52 of the annular flexible support member 24 can define a channel 54 for receiving an end 29 of the flange portion 22 at the aperture 26. The portion 52 can be immovably associated with respect to the aperture 26.

The annular elastomeric member 24 can include a living hinge portion 58 disposed between the lip 28 and the portion 52. The living hinge 58 promotes continuous engagement between the seal 32 and the wear sleeve 14 when the shaft 12 and the tubular portion 20 become misaligned. The annular flexible support member 24 can flex and resiliently deform about the living hinge portion 58 to enhance the likelihood that the surfaces 40, 46 maintain continuous, intimate engagement with the surface 16. The elastomeric member 24 can also include a debris lip 56.

Figure 3:
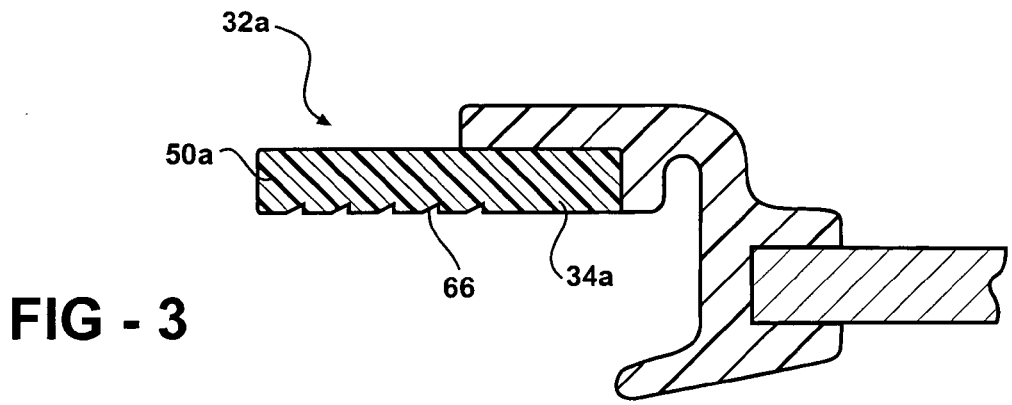
FIG. 3 is a partial cross-sectional view of an alternative embodiment of the seal according to the present invention.
Figure 4:
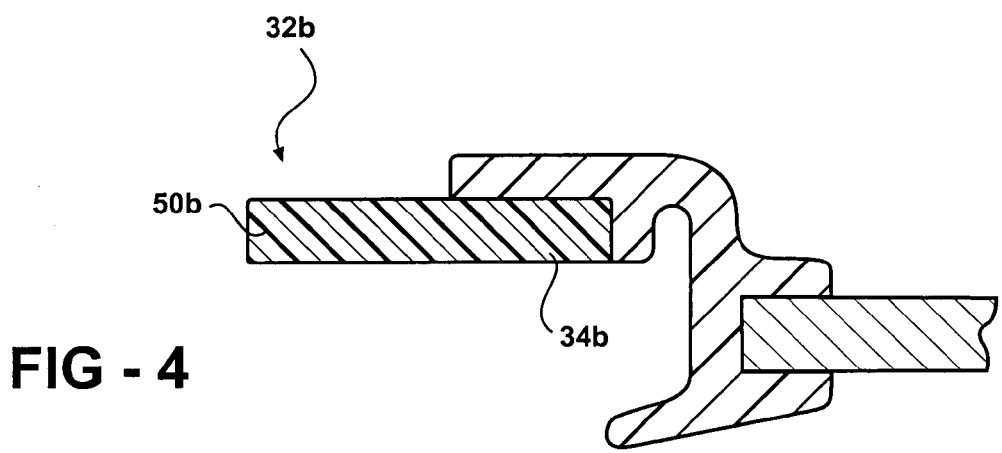
FIG. 4 is a partial cross-section view of a second alternative embodiment of the seal according to the present invention.
Figure 5:
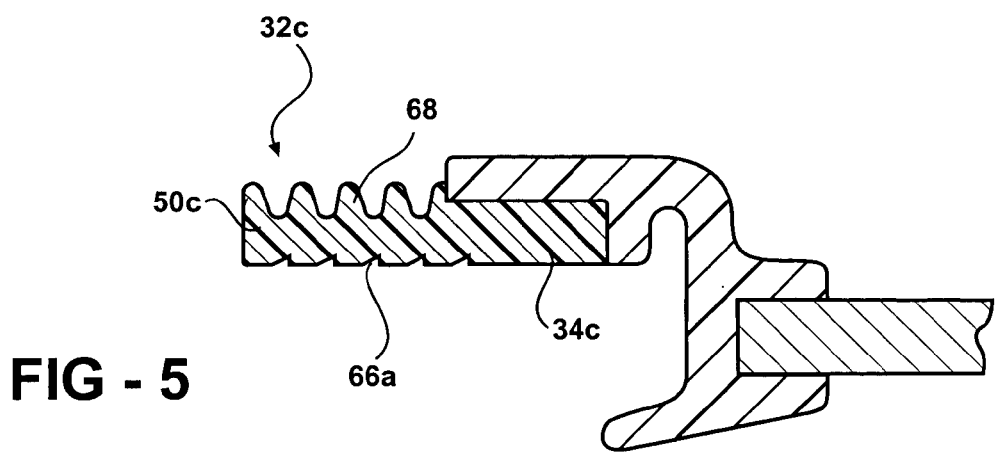
FIG. 5 is a partial cross-sectional view of a third embodiment of the seal according to the present invention.

The first and second collar portions 34, 38, can be integrally formed with respect to one another. Both portions 34, 38 can be formed from polytetrafluoroethylene. One or both of the portions 34, 38 can include hydrostatic aids 42 to direct oil in a desired direction. For example, the seal 32 can include grooves or channels as disclosed in U.S. Pat. No. 6,168,164; said patent being hereby incorporated by reference. Alternatively, as shown in FIG. 3, the seal 32a can define grooves 66 adjacent a second end 50a and define a substantially flat sealing surface adjacent the portion 34a. Alternatively, as shown in FIG. 4, the seal 32b can define a substantially flat sealing surface between the portion 34b and the end 50b. Alternatively, as shown in FIG. 5, seal 32c can include either concentric or spiral grooves 66a adjacent an end 50c as well as U-shaped projections 68 extending outwardly from the seal 32c.

Referring now to FIGS. 1 and 2, the seal 32 can also include a living hinge portion 36 disposed between the portions 34, 38. The living hinge portion 28 can define an annular, outwardly facing notch 64. The living hinge portion 36 can enhance the flexibility of the seal 32 and can also reduce the likelihood of failure. For example, the hinge portion 36 can facilitate flexing of the seal 32 The living hinge portion 36 can define a sealing surface 44. The sealing surfaces 40, 44, and 46 can be integrally formed to define a substantially continuous sealing surface.

While the invention has been described in connection with what is presently considered the most practical and preferred embodiment, it is to be understood that the invention is not to be limited to the disclosed embodiments. On the contrary, it is intended that the present application is intended to cover various modifications and equivalent arrangements included within the scope and spirit of the claims. The claims are to be accorded the broadest possible interpretation so as to encompass all such modifications and equivalent structures as permitted under law. It is also to be understood that any feature of the disclosed embodiments can be used in combination with any other feature of any of the other embodiments.

The invention claimed is:

1. A seal assembly for establishing a dynamic sealing interface with respect to a rotating surface, said seal assembly comprising:
   a rigid carrier;
   an annular support member fabricated from a resilient, polymeric material, said annular support member fixedly engaged with said rigid carrier and having a lip extending outwardly from said carrier to define a flexible annular supporting surface; and
   a PTFE seal having a first collar portion connected directly to said flexible annular supporting surface and defining a first sealing surface and a second collar portion freely extending past said annular supporting surface of said lip and defining an unreinforced second sealing surface, whereby said first and second sealing portions directly engage the rotating surface to establish the dynamic seal therebetween while only said first sealing portion remains backed and reinforced by said flexible annular support member.

2. The seal assembly of claim 1 wherein said first sealing surface is concentric with respect to said annular supporting surface.

3. The seal assembly of claim 1 wherein said first and second collar portions are integrally formed with respect to one another.

4. The seal assembly of claim 1 wherein said annular support member comprises rubber.

5. The seal assembly of claim 1 wherein said seal further comprises:
   hydrodynamic features extending along said first and second sealing surfaces.

6. The seal assembly of claim 1 wherein said seal further comprises:
   internally formed grooves extending along said first and second sealing surfaces.

7. The seal assembly of claim 1 wherein said seal defines a plurality of outwardly facing u-shaped recesses.

8. The seal assembly of claim 1 further comprising:
   an annular living hinge portion extending between said first collar portion and second collar portion and past said lip of said annular support member.

9. The seal assembly of claim 8 wherein said annular living hinge portion defines an annular notch.

10. A seal assembly for establishing a dynamic sealing interface with respect to a rotating surface, said seal assembly comprising:
    a wear sleeve adapted to encircle a rotatable shaft and having an outwardly facing annular sealing surface;
    a carrier having a tubular portion spaced from and substantially concentric with said wear sleeve and a radial flange portion extending from said tubular portion;
    an annular support member fabricated from a resilient, polymeric material, said annular support member fixedly connected to said radial flange portion opposite said tubular portion and having a lip extending outwardly from said carrier to define a flexible annular supporting surface opposing said annular sealing surface of said wear sleeve; and
    a PTFE seal in sealing engagement with said wear sleeve and having a first collar portion connected to said annular supporting surface and a second collar portion freely extending from said first collar portion past said annular supporting surface, whereby said first and second sealing portions directly engage the rotating surface to establish the dynamic seal therebetween while only said first sealing portion remains backed and reinforced by said flexible annular support member.

11. The seal assembly of claim 10 further comprising:
    an annular living hinge portion extending between said first collar portion and said second collar portion and past said lip of said annular support member.

12. A seal assembly for establishing a dynamic sealing interface with respect to a rotating surface, said seal assembly comprising:
    a wear sleeve adapted to encircle a rotatable shaft and having an outwardly facing annular sealing surface;
    a carrier having a tubular portion spaced from and substantially concentric with said wear sleeve and a radial flange portion extending from the tubular portion;
    an annular support member fabricated from a resilient, polymeric material, said annular support member fixedly connected to the end of the radial flange portion opposite the tubular portion and having a lip extending outwardly from said carrier to define a flexible annular supporting surface opposing the annular sealing surface of said wear sleeve; and
    a PTFE seal in sealing engagement with said wear sleeve and having a first collar portion connected to the annular supporting surface and a second collar portion and an annular living hinge portion extending between the first collar portion second collar portion, whereby said first and second sealing portions form a generally continuous cylindrical sealing surface directly engaging the rotating surface to establish the dynamic seal therebetween while only said first sealing portion remains backed and reinforced by said flexible annular support member.

13. A seal assembly for establishing a dynamic sealing interface with respect to a rotating surface, said seal assembly comprising:
    a rigid carrier;
    an annular support member of rubber molded to said rigid carrier and having a lip extending outwardly from said carrier to define a flexible annular supporting surface; and
    a seal of PTFE material having a first collar portion connected directly to said annular supporting surface and a second collar portion freely extending from said first collar portion, and an annular living hinge portion disposed between the first collar portion second collar portion, whereby said first and second sealing portions form a generally continuous cylindrical sealing surface directly engaging the rotating surface to establish the dynamic seal therebetween while only said first sealing portion remains backed and reinforced by said flexible annular support member.

14. The seal assembly of claim 13 wherein said dynamic sealing interface with the rotating surface is generally centered about an axis, and wherein the first collar portion, the second collar portion, and the annular living hinge portion are concentric relative to said axis.

15. The seal assembly of claim 13 wherein each of the first collar portion, the second collar portion, and the annular living hinge portion define sealing surfaces.

* * * * *

UNITED STATES PATENT AND TRADEMARK OFFICE
CERTIFICATE OF CORRECTION

PATENT NO. : 7,100,924 B2
APPLICATION NO. : 10/757919
DATED : September 5, 2006
INVENTOR(S) : David Michael Toth and Bhawani Sankar Tripathy It is certified that error appears in the above-identified patent and that said Letters Patent is hereby corrected as shown below:

Column 2, line 53: "living hinge portion 28" should be --living hinge portion 36--.

Column 2, line 57: "seal 32  The" should be --seal 32.  The--.

Signed and Sealed this

Sixth Day of March, 2007

JON W. DUDAS
*Director of the United States Patent and Trademark Office*